(12) United States Patent
Kim et al.

(10) Patent No.: US 9,159,996 B2
(45) Date of Patent: Oct. 13, 2015

(54) SYNTHESIZING METHOD FOR LITHIUM TITANIUM OXIDE NANOPARTICLE USING SUPERCRITICAL FLUIDS

(75) Inventors: Jaehoon Kim, Seoul (KR); Kyung Yoon Chung, Seoul (KR); Byung Won Cho, Seoul (KR); Jon Min Park, Seoul (KR); Nugroho Agung, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 931 days.

(21) Appl. No.: 13/251,414

(22) Filed: Oct. 3, 2011

(65) Prior Publication Data

US 2012/0202120 A1  Aug. 9, 2012

(30) Foreign Application Priority Data

Feb. 7, 2011  (KR) .................. 10-2011-0010807

(51) Int. Cl.
 *C01G 23/00* (2006.01)
 *H01M 4/485* (2010.01)
 *B82Y 30/00* (2011.01)
 *B82Y 40/00* (2011.01)

(52) U.S. Cl.
 CPC .............. *H01M 4/485* (2013.01); *B82Y 30/00* (2013.01); *B82Y 40/00* (2013.01); *C01G 23/005* (2013.01); *C01P 2002/72* (2013.01); *C01P 2004/03* (2013.01); *C01P 2004/04* (2013.01); *C01P 2004/64* (2013.01); *C01P 2006/12* (2013.01); *C01P 2006/40* (2013.01); *Y02E 60/122* (2013.01)

(58) Field of Classification Search
 None
 See application file for complete search history.

(56) References Cited

U.S. PATENT DOCUMENTS

| 2004/0197657 A1* | 10/2004 | Spitler et al. ............... 429/231.1 |
| 2006/0286456 A1* | 12/2006 | Fu et al. ..................... 429/231.1 |
| 2011/0135564 A1* |  6/2011 | Kim et al. ..................... 423/598 |

FOREIGN PATENT DOCUMENTS

| JP | 01-122961 A    |  5/1989 |
| JP | 2005-340078 A  | 12/2005 |
| KR | 1020070082900 A|  8/2007 |

OTHER PUBLICATIONS

Tadafumi Adschiri, et al; "Rapid and Continuous Hydrothermal Crystallization of Metal Oxide Particles in Supercritical Water", Journal of the American Ceramic Society, vol. 75, Issue 4, pp. 1019-1022, Apr. 1992.

* cited by examiner

*Primary Examiner* — Steven Bos
(74) *Attorney, Agent, or Firm* — Ladas Parry LLP (57) ABSTRACT

A method for synthesizing lithium titanium oxide-based anode active material nanoparticles, and more particularly, a method for synthesizing lithium titanium oxide-based anode active material nanoparticles using a supercritical fluid condition is disclosed herein. The method may include (a) preparing a lithium precursor solution and a titanium precursor solution, (b) forming lithium titanium oxide-based anode active material nanoparticles by introducing the lithium precursor solution and titanium precursor solution into an reactor at a supercritical fluid condition, and (c) cleaning and drying the nanoparticles, and may further include (d) calcinating the nanoparticles at 500-1000° C. for 10 minutes to 24 hours after the step (c).

20 Claims, 7 Drawing Sheets

SYNTHESIZING METHOD FOR LITHIUM TITANIUM OXIDE NANOPARTICLE USING SUPERCRITICAL FLUIDS

RELATED APPLICATION

This application claims the benefit of Korean Patent Application No. 10-2011-0010807, filed on Feb. 7, 2011, which is hereby incorporated by reference for all purposes as if fully set forth herein.

BACKGROUND OF THE INVENTION

1. Field of the Invention

The present invention relates to a method for synthesizing lithium titanium oxide-based anode active material nanoparticles, and more particularly, to a method for synthesizing lithium titanium oxide-based anode active material nanoparticles using a supercritical fluid condition.

2. Background of the Invention

At present, lithium secondary batteries are widely used for supplying power of information-related devices or communication-related devices such as computers, portable phones, cameras, and the like. Furthermore, in recent years, in order to reduce the dependence on petroleum and to reduce greenhouse gas emissions, the development of a plug-in hybrid electric vehicle (PHEV) and an electric vehicle, which are green electric vehicles using lithium secondary batteries as an energy source, have been competitively carried out. In addition to the transportation applications, the researches and development of lithium secondary batteries have been actively carried out as the use of medium or large-sized batteries is expected to be drastically increased in various fields such as a robot, a backup power, a medical device, a machine tool, an uninterruptible power supply (UPS), and the like. Large-sized lithium secondary batteries, particularly for use in an electric vehicle, a machine tool, an uninterruptible power supply, and the like, should charge or discharge electricity at a high rate for a short period of time. Thus it is important to develop lithium secondary batteries having a high-rate charging and discharging capacity and having a long-term stability for the large-scale applications.

At present, various carbon-based porous materials including synthetic graphite, natural graphite, hard carbon, and soft carbon, which are capable of insertion/secession of lithium ions, are widely used for an anode material of the lithium secondary battery. A carbon-based anode material has an advantage of providing an operating voltage similar to that of lithium metal, having a very stable structure, allowing long reversible charge and discharge of lithium, and having an excellent durability. However, the carbon-based anode material has a low density of graphite (theoretical density of graphite: 2.2 g/cm$^3$), thereby having a low energy density per unit volume of the battery. Furthermore, since the oxidization and reduction potential thereof is lower by about 0.1 V than that of Li/Li$^+$, it can be decomposed due to the reaction with an organic electrolyte used in the battery cell construction, and reacted with lithium to form a layer (hereinafter, a solid electrolyte interface (SEI) film) covering surface of the carbon material, thereby deteriorating the charge-discharge capacity. In particular, in the application field that requires a high rate discharge capacity, such as electric vehicle and the like, the formation of a SEI film deteriorating the high rate characteristic because a resistance of lithium insertion/deinsertion increases. In addition, when charged and discharged at a high rate, lithium with a high reactivity can form on the surface of carbon-based anode surface, which can react with an electrolyte or an cathode material and thus it is likely to be exploded, thereby causing a problem of deteriorating stability. Accordingly, there is an increased necessity to develop a new anode active material having high stability and reliability as well as having high performance for the large-scale applications.

In recent years, for such a anode active material of the large-sized secondary battery, lithium titanium oxide (LTO)-based anode active materials, having high stability and reliability as well as high performance, are widely used. LTO is a compound expressed by the following formula (1).

For the LTO, for example, there are $Li_{0.8}Ti_{2.2}O_4$, $Li_{2.67}Ti_{1.33}O_4$, $LiTi_2O_4$, $Li_{1.33}Ti_{1.67}O_4$ (or $Li_{4/3}Ti_{5/3}O_4$), $Li_{1.14}Ti_{1.71}O_4$, and the like. Of them, the chemical formula of $Li_{4/3}Ti_{5/3}O_4$ having a spinel structure during lithium charging and discharging is as follows.

The operating voltage of $Li_{4/3}Ti_{5/3}O_4$ is 1.3-1.6 V, which is higher than that of the existing carbon-based anode active material, and a volume change caused by the transformation of a spinel structure ($Li_{4/3}Ti_{5/3}O_4$) to a rock-salt structure ($Li_{7/3}Ti_{5/3}O_4$) is very small, which is less than 0.1%, thereby having a very excellent cycling performance. Furthermore, there exists almost no irreversible reaction, and thus it may have an advantage that above 90% of the initial capacity can be maintained even after charging and discharging for a long period of time. Furthermore, the oxidization and reduction potential of $Li_{4/3}Ti_{5/3}O_4$ is high with respect to Li/Li$^+$ (~1.5 V) and thus an electrolyte is not almost likely to be decomposed, thereby having a very low possibility of forming a SEI film that has been a problem in the carbon-based anode material. For another advantage of $Li_{4/3}Ti_{5/3}O_4$, due to a high oxidation/reduction potential, metal-type lithium that has been a problem of carbon-based anode materials during high-rate charging and discharging is not likely to be extracted, thereby having high stability during high-rate charging and discharging, and as a result, it can be used as a power source of PHEV, an electric vehicle, a machine tool, and a uninterruptible power supply. Moreover, the theoretical density thereof is about 3.5 g/cm$^3$, which is much higher than that of the carbon-based anode material, and thus the capacity per volume is similar to the existing carbon material. Accordingly, due to the high stability, the high charge and discharge capacity and the reliability at a high rate, $Li_{4/3}Ti_{5/3}O_4$ is one of promising anode materials for use in the large-sized secondary battery such as an electric vehicle and an uninterruptible power supply.

For the presently known method of synthesizing $Li_{4/3}Ti_{5/3}O_4$ with a spinel structure, there is a solid-state method in which $TiO_2$ particles and a lithium precursor such as LiOH, $Li_2CO_3$, $LiNO_3$, and the like are mixed in a solid state at temperatures between 400 to 600° C. for 12 to 24 hours using a ball mill process or the like, and then calcinated at temperatures between 800 to 1000° C. for 12 to 24 hours. However, the solid-state method requires performing a ball mill process for a long period of time at high temperature to synthesize a single-phase material in a solid state from a mixture including a lithium precursor and $TiO_2$, and a long calcination step is necessary to enhance the crystallinity of particles. Thus the solid-state method for producing $Li_{4/3}Ti_{5/3}O_4$ is unproductive and uneconomic and typically requires large energy consumption. The formed particles have a relatively large size in a micron unit (10-100 μm; the Brunauer-Emmett-Teller (BET) specific surface area 2-5 m$^2$/g) due to the long calcination step at high temperature and thus the insertion/deinsertion rate of lithium ions is very low, thereby causing a problem that the charge and discharge capacity is low at about 70% of its theoretical capacity. In order to increase the charge and discharge capacity of $Li_{4/3}Ti_{5/3}O_4$, there has been proposed a method of synthesizing the material $Li_{4/3}Ti_{5/3}O_4$ in a nano size to reduce the insertion/deinsertion distance of lithium ions within the particle. However, high energy is consumed to synthesize nanosized particles with a method of ball mill or the like, and a separate mechanical grinding process for a long period of time is necessary, thereby decreasing productivity, widening the size distribution of particles, and incurring a loss of material during a distributing process.

For other methods of synthesizing the anode active material $Li_{4/3}Ti_{5/3}O_4$ having a spinel structure, there exist a vapor-based method such as spray-pyrolysis, laser ablation, plasma arc synthesis, etc. and a solution-based method such as hydrothermal method, co-precipitation, emulsion-drying, sol-gel method, etc. In case of the vapor-based method, it may be effective in synthesizing single-phase metal oxide particles having a relatively uniform particle distribution, the vapour pressure of different raw materials is different when synthesizing a composite metal oxide such as $Li_{4/3}Ti_{5/3}O_4$, thereby having difficulty in controlling composition of synthesized particles. Therefore, it has a problem that an excessive quantity of impurities is highly likely to be co-produced and be mixed with $Li_{4/3}Ti_{5/3}O_4$. In case of the solution-based method, composition control may be easier than the vapor-based method since it is synthesized from a uniform mixture but the size of synthesized particles is large and the distribution of particles is wide. Therefore, when applied to the synthesis of $Li_{4/3}Ti_{5/3}O_4$, the solution-based methods can have a problem that the charge and discharge capacity is remarkably deteriorated. Furthermore, most of the solution-based methods require long reaction times of 12 to 48 hours up to the formation of a lithium titanium oxide-based precursor material, but lithium composition is not completely contained in the structure of the lithium titanium oxide-based precursor material, and thus it may require long calcination times for 12 to 48 hours to increase the diffusion of lithium and to increase crystallinity. Moreover, each process for synthesizing $Li_{4/3}Ti_{5/3}O_4$ such as a precipitation process, a reaction process, a calcination process, and the like mostly are carried out in a batch mode, thereby having a problem that the uniformity and productivity of the product can be deteriorated. In addition, waste acids and organic solvents are produced as byproducts, causing environmental pollution.

On the other hand, a method of continuously synthesizing nanosized metal oxide using supercritical fluids was released in the beginning of the 1990s (T. Adschiri; Y. Hakuta; K. Sue; K. Arai, Journal of American Ceramic Society, 1992, 75 1019). A supercritical fluid is a fluid in a state above the critical temperature and critical pressure of the fluid, exhibiting both gas and liquid phase properties, and thus it is light in weight and very excellent in mass transfer and heat transfer as in a gas phase, and also has a property of dissolving other materials as in a liquid phase. Supercritical water (critical temperature=374° C.; critical pressure=221 bar) is one of most widely used supercritical fluids in synthesizing metal oxide nanoparticles. In the synthesis of metal oxide nanoparticles using a supercritical water, the crystalline growth rate in the supercritical water is very fast, allowing the metal oxide to be synthesized at a fast rate (<1 minute), and the solubility of reaction intermediate in the supercritical water is remarkably lower than that of water at ambient condition, allowing the metal oxide to be synthesized in a nano size, and continuous synthesis of metal oxide in supercritical water processes can be easily implemented, thereby having high productivity as well as providing a uniform size distribution of the synthesized metal oxides. Even in case of synthesizing a metal oxide using alcohol at its supercritical state such as supercritical methanol (critical temperature=240° C.; critical pressure=79 bar), supercritical ethanol (critical temperature=241° C.; critical pressure=63 bar) supercritical propanol (critical temperature=264° C.; critical pressure=52 bar), supercritical butanol (critical temperature=290° C.; critical pressure=44 bar), supercritical pentanol (critical temperature=315° C.; critical pressure=39 bar), and the like among supercritical fluids, it may have an advantage such as fast crystalline growth rate, nanosized metal oxide synthesis, high purity, and continuous process as in case of synthesizing a metal oxide using the supercritical water.

SUMMARY OF THE INVENTION

The present invention is contrived to solve the foregoing problem in the process of synthesizing $Li_{4/3}Ti_{5/3}O_4$ particles using a solid-state method, a solution-based method, and a vapor-based method in the related art, and an object of the present invention is to provide a method of synthesizing lithium titanium oxide-based anode active material nanoparticles having a spinel structure in which the purity is very high, the lithium ion transfer rate is very fast, and the ion conductivity is high, and thus it has a very excellent electrochemical properties, particularly in a charge and discharge capacity of lithium secondary batteries.

Another object of the present invention is to allow the process of synthesizing lithium titanium oxide-based anode active material nanoparticles having a spinel structure to be continuously carried out, thereby retaining homogeneity of quality and high productivity, and providing lithium titanium oxide-based anode active material nanoparticles having a spinel structure synthesized as described above.

The method for synthesizing lithium titanium oxide-based anode active material nanoparticles according to the present invention may include (a) preparing a lithium precursor solution and a titanium precursor solution, (b) introducing the lithium precursor solution and titanium precursor solution into an reactor at a high temperature and a high pressure to form lithium titanium oxide-based anode active material nanoparticles, and (c) cleaning and drying the nanoparticles, and may further include (d) calcinating the nanoparticles at 500-1000° C. for 10 minutes to 24 hours subsequent to the step (c).

According to the present disclosure, $Li_{4/3}Ti_{5/3}O_4$ anode active material nanoparticles with an excellent electrochemical property may be synthesized by using supercritical fluids. A multi-stage batch wise process such as a mixture process, a calcination process, a grinding process, a screening process, and the like which are often required for the solid-state method in the related art, and a multi-stage batch wise process such as a precipitation process, a reaction process, a calcination process, and the like which are often required for the solution-based method can be simplified into a single-step process, thereby drastically reducing the equipment cost and operating cost. In addition, in case of using a continuous synthesis method, it can facilitate mass production and uniform quality control and is economical.

The $Li_{4/3}Ti_{5/3}O_4$ anode active material synthesized according to the foregoing method has an excellent electrochemical properties, particularly in a charge and discharge capacity, and does not require a long calcination process at high temperatures as in the related art, thereby allowing $Li_{4/3}Ti_{5/3}O_4$ having an excellent charge and discharge capacity to be synthesized even with a short calcination process.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

A method of synthesizing lithium titanium oxide-based anode active material nanoparticles according to the present invention may include (a) preparing a lithium precursor solution and a titanium precursor solution, (b) forming lithium titanium oxide-based anode active material nanoparticles by introducing the lithium precursor solution and titanium precursor solution into an reactor at a supercritical fluid condition, and (c) cleaning and drying the nanoparticles. The supercritical fluid, particularly supercritical water, is defined as water above its critical temperature and critical pressure. The supercritical water exhibiting both gas and liquid phases is light in weight and very excellent in mass transfer and heat transfer as in a gas phase, and also has a property of dissolving other materials as in a liquid phase. Furthermore, using a characteristic in which the crystalline growth rate in a supercritical water is very fast, metal oxide nanoparticles can be synthesized at a fast rate (<1 minute), and the solubility of reaction intermediate in the supercritical water is remarkably lower than that of water at ambient condition, allowing the metal oxide to be synthesized in a nano size, and continuous synthesis of metal oxide in supercritical water processes can be easily implemented, thereby having high productivity as well as providing a uniform size distribution of the synthesized metal oxides. Accordingly, it may be possible to form lithium titanium oxide-based anode active material particles having a nano size in a supercritical water condition. Even in case of synthesizing a metal oxide using alcohol in its supercritical state, it may have an advantage such as fast crystalline growth rate, nano-sized metal oxide synthesis, high purity, and continuous process as in the case of synthesizing a metal oxide using the supercritical water.

The step (b) may be (b-1) forming lithium titanium oxide-based anode active material nanoparticles and crystallizing the nanoparticles by introducing the is lithium precursor solution and titanium precursor solution into a batch-type reactor and mixing them the supercritical fluid condition, or (b-2) forming lithium titanium oxide-based anode active material nanoparticles and crystallizing the nanoparticles by introducing the lithium precursor solution and titanium precursor solution into a continuous-type reactor maintaining the supercritical fluid condition.

The process using a continuous reactor instead of a batch-type reactor may be more suitable for mass production, and also have an advantage capable of obtaining uniform resultant substances.

The step (c) is a process of cleaning and drying the crystallized particles. $Li_{4/3}Ti_{5/3}O_4$ nanoparticles synthesized in the step (b) is separated from the solution, and then cleaned and dried. The separation may use a centrifugal or a filtering process but not limited to this if the unreacted precursor solution can be separated with the synthesized nanoparticles.

The cleaning of $Li_{4/3}Ti_{5/3}O_4$ nanoparticles synthesized in the step (c) may use water, methanol, ethanol, or an organic solvent such as tetrahydrofuran, or other organic solvents for dissolving lithium and titanium precursors and reaction intermediates but not limited to this if the remaining unreacted precursor can be removed.

The drying of $Li_{4/3}Ti_{5/3}O_4$ nanoparticles cleaned in the step (c) may use vacuum drying, oven drying or freeze drying but not limited to this if the cleaning solution can be dried.

The lithium titanium oxide-based anode active material nanoparticles may be $Li_{4/3}Ti_{5/3}O_4$ anode active material nanoparticles having a spinel structure, a solvent of the lithium precursor solution and titanium precursor solution may be at least any one selected from a group consisting of water (critical temperature=374° C.; critical pressure=221 bar), methanol (critical temperature=239° C.; critical pressure=81 bar), ethanol (critical temperature=241° C.; critical pressure=63 bar), propanol (critical temperature=264° C.; critical pressure=52 bar), isopropyl alcohol (critical temperature=307° C.; critical pressure=41 bar), butanol (critical temperature=289° C.; critical pressure=45 bar), isobutanol (critical temperature=275° C.; critical pressure=45 bar), 2-butanol (critical temperature=263° C.; critical pressure=42 bar), tert-butanol (critical temperature=233° C.; critical pressure=40 bar), n-pentanol (critical temperature=307° C.; critical pressure=39 bar), isopentyl alcohol (critical temperature=306° C.; critical pressure=39 bar), 2-methyl-1-butanol (critical temperature=302° C.; critical pressure=39 bar), neopentyl alcohol (critical temperature=276° C.; critical pressure=40 bar), diethyl carbinol (critical temperature=286° C.; critical pressure=39 bar), methyl propyl carbinol (critical temperature=287° C.; critical pressure=37 bar), methyl isopropyl carbinol (critical temperature=283° C.; critical pressure=39 bar), dimethyl ethyl carbinol (critical temperature=271° C.; critical pressure=37 bar), 1-hexanol (critical temperature=337° C.; critical pressure=34 bar), 2-hexanol (critical temperature=310° C.; critical pressure=33 bar), 3-hexanol (critical temperature=309° C.; critical pressure=34 bar), 2-methyl-1-pentanol (critical temperature=331° C.; critical pressure=35 bar), 3-methyl-1-pentanol (critical temperature=387° C.; critical pressure=30 bar), 4-methyl-1-pentanol (critical temperature=330° C.; critical pressure=30 bar), 2-methyl-2-pentanol (critical temperature=286° C.; critical pressure=36 bar), 3-methyl-2-pentanol (critical temperature=333° C.; critical pressure=36 bar), 4-methyl-2-pentanol (critical temperature=301° C.; critical pressure=35 bar), 2-methyl-3-pentanol (critical temperature=303° C.; critical pressure=35 bar), 3-methyl-3-pentanol (critical temperature=302° C.; critical pressure=35 bar), 2,2-dimethyl-1-butanol (critical temperature=301° C.; critical pressure=35 bar), 2,3-dimethyl-1-butanol (critical temperature=331° C.; critical pressure=35 bar), 2,3-dimethyl-2-butanol (critical temperature=331° C.; critical pressure=35 bar), 3,3-dimethyl-1-butanol (critical temperature=331° C.; critical pressure=35 bar), 2-ethyl-1-butanol (critical temperature=307° C.; critical pressure=34 bar), 1-heptanol (critical temperature=360° C.; critical pressure=31 bar), 2-heptanol (critical temperature=335° C. C; critical pressure=30 bar), 3-heptanol (critical temperature=332° C.; critical pressure=30 bar), and 4-heptanol (critical temperature=329° C.; critical pressure=30 bar), and the supercritical fluid condition is above the supercritical temperature and supercritical pressure.

The lithium precursor may be at least any one selected from a group consisting lithium hydroxide (LiOH), lithium hydroxide monohydrate ($LiOH \cdot H_2O$), lithium chloride (LiCl), lithium acetate ($LiCH_3COO$), lithium acetate dihydrate ($LiCH_3COO \cdot 2H_2O$), lithium sulphate ($Li_2SO_4$), lithium sulfate monohydrate ($Li_2SO_4 \cdot H_2O$), lithium phosphate ($Li_3PO_4$), lithium nitrate ($LiNO_3$), and their salts, and the titanium precursor may be at least any one selected from a group consisting of titanium (IV) tetramethoxide ($Ti(OCH_3)_4$), titanium (IV) tetraethoxide ($Ti(OCH_2CH_3)_4$), titanium (IV) tetra-n-propoxide ($Ti(OCH_2CH_2CH_3)_4$), titanium (IV) tetra-iso-propoxide ($Ti[OCH(CH_3)_2]_4$), titanium (IV) tetra-n-butoxide ($Ti(OCH_2CH_2CH_2CH_3)_4$), titanium (IV) tetra-iso-butoxide ($Ti[OCHCH_2(CH_3)_2]_4$), titanium (IV) tetra-n-pentoxide ($Ti(OCH_2CH_2CH_2CH_2CH_3)_4$), titanium (IV) tetra-iso-pentoxide ($Ti[OCHCH_2CH_2(CH_3)_2]_4$), and their salts.

The concentration of a lithium precursor in the lithium precursor solution may be 0.001-10 mol/l, preferably 0.001-5 mol/l. If the concentration of a lithium precursor is out of the range, less than 0.001 mol/l, then the concentration is too low and an amount of the anode active material synthesized in a unit period of time becomes small, thereby causing a reduction in the production efficiency. If the concentration of a lithium precursor exceeds 10 mol/l, then the concentration is too high and a size of the synthesized anode active material can be large and uniformity is reduced, thereby causing a deterioration in the particle quality.

The concentration of a titanium precursor in the titanium precursor solution may be 0.001-10 mol/l, and preferably 0.001-5 mol/l. If the concentration of a titanium precursor is out of the range, less than 0.001 mol/l, then the concentration is too low and an amount of the anode active material synthesized in a unit period of time becomes small, thereby causing a reduction in the production efficiency. If the concentration of a titanium precursor exceeds 10 mol/l, then the concentration is too dense and a size of the synthesized anode active material becomes large and uniformity is reduced, thereby causing a deterioration in the quality.

The step (b) may be carried out at 240-600° C. and 40-600 bar, and preferably at 300-500° C. and 100-500 bar. When the reaction temperature is less than 240° C. and the reaction pressure is less than 40 bar, it may cause a problem in which the sized of synthesized nanoparticles becomes large and the distribution of particle sizes becomes wide and the crystallinity becomes low. When the reaction temperature exceeds 600° C. and the reaction pressure exceeds 600 bar, it may cause a problem in which the cost for maintaining high temperature and high pressure is increased and agglomeration between particles is increased in a high temperature and high pressure condition.

The step (b-1) may be carried out for 30 seconds to 24 hours, and preferably for 1 minute to 12 hours, and the step (b-2) of forming nanoparticles may be carried out for 30 seconds to 24 hours, and preferably for 1 minute to 12 hours. When the residence time in an reactor is less than 30 seconds, the reaction time is too short, thereby causing a problem in which the crystallinity of particles may not be increased but impurities may be mixed therewith. When exceeding 24 hours, agglomeration between particles may be increased since it is a high temperature and high pressure condition, thereby increasing the size of particles, and causing a reduction in the productivity due to an increase of the residence time. The steps of forming and crystallizing particles may not be distinguished there between in case of a batch process, but in case of a continuous reactor, they may be timely separated from each other to be controlled.

The foregoing method may further include (d) calcinating the nanoparticles at 500-1000° C. for 10 minutes to 24 hours subsequent to the step (c). The dried resultant substances may be calcinated, thereby controlling the particle size, crystallinity, and compactness. The calcinated $Li_{4/3}Ti_{5/3}O_4$ particles have nano-crystals with a spinel structure. The calcination temperature may not be particularly limited, but preferably 500-1000° C., and more preferably 600-800° C. The calcination temperature may be preferably 10 minutes to 24 hours, and more preferably 1 to 12 hours. When the calcination temperature is less than 500° C. and the calcination time is less than 10 minutes, it may cause a problem of low crystallinity and low compactness. When the calcination temperature exceeds 1000° C. and the calcination time exceeds 24 hours, agglomeration between particles may be increased due to a long calcination process to increase the size of particles, thereby increasing the particle size and increasing the cost for maintaining high temperature.

The diameter of the nanoparticles synthesized by the foregoing method may be 1 to 500 nm, and more preferably 10-250 nm. When the diameter of nanoparticles is less than 1 nm, it may cause a problem of increasing cohesion between particles, thus resulting in difficulty in handling the particles. When exceeding 500 nm, the property of nanoparticles may be reduced, thereby deteriorating an electrochemical property such as a charge and discharge capacity, and the like in case of forming a lithium secondary battery.

Nanoparticles according to the present invention may be lithium titanium oxide-based anode active material nanoparticles synthesized according to the foregoing method, and an electrode according to the present invention may include a anode active material, a conductive agent, a binder, and an electrolyte, wherein the anode active material includes lithium titanium oxide-based anode active material nanoparticles synthesized according to the synthesis method of the present invention, and a secondary battery may include an electrode, an electrolyte, and a separator film, wherein the electrode is an electrode fabricated by an electrode fabrication method of the present invention.

EXAMPLES

Hereinafter, the present invention will be described in more detail through examples. The examples are provided to specifically describe the present invention, and the present invention will not be limited to this.

Characteristic Analysis of $Li_{4/3}Ti_{5/3}O_4$ Anode Active Material Nanoparticles A scanning electron microscopy (hereinafter, referred to as "SEM") of Hitachi and a transmission electron microscopy (hereinafter, referred to as "TEM") of EFI were used to analyze the particle size and shape of $Li_{4/3}Ti_{5/3}O_4$ anode active material nanoparticles synthesized by the synthesis method of the present invention. An X-ray diffractometer (hereinafter, referred to as "XRD") of Rigaku was used to analyze the composition of nanoparticles, and a specific surface area analyzer (Brunauer, Emmet, and Teller, hereinafter referred to as "BET") was used to analyze the surface area of particles.

An anode was fabricated by using acetylene black as a conductive agent, and polyvinylidene fluoride (PVDF) as a binder to analyze an electrochemical characteristic of $Li_{4/3}Ti_{5/3}O_4$ anode active material nanoparticles having a spinel structure. At this time, n-methylpyrrolidone (NMP) was used as a solvent, and a anode active material, a conductive agent, and a binder were mixed with a weight ratio of 85:10:5 to synthesize a slurry. The synthesized slurry was applied to an copper foil in a thin plate of 250 μm in thickness, and then dried in an oven at 80° C. for more than 6 hours. For an electrolyte, ethylene carbonate (EC), ethyl methyl carbonate (EMC), and diethyl carbonate (DEC) which are EC-based materials were mixed and used with a volume ratio of 1:1:1. Lithium hexafluoro phosphate ($LiPF_6$) was dissolved by using Li metal as an cathode to fabricate a coin-type half battery. The fabricated battery was tested at 0.1-3.0 V under 1 C condition to analyze a charge and discharge capacity and a cyclability of the battery.

Example 1

Figure 1:
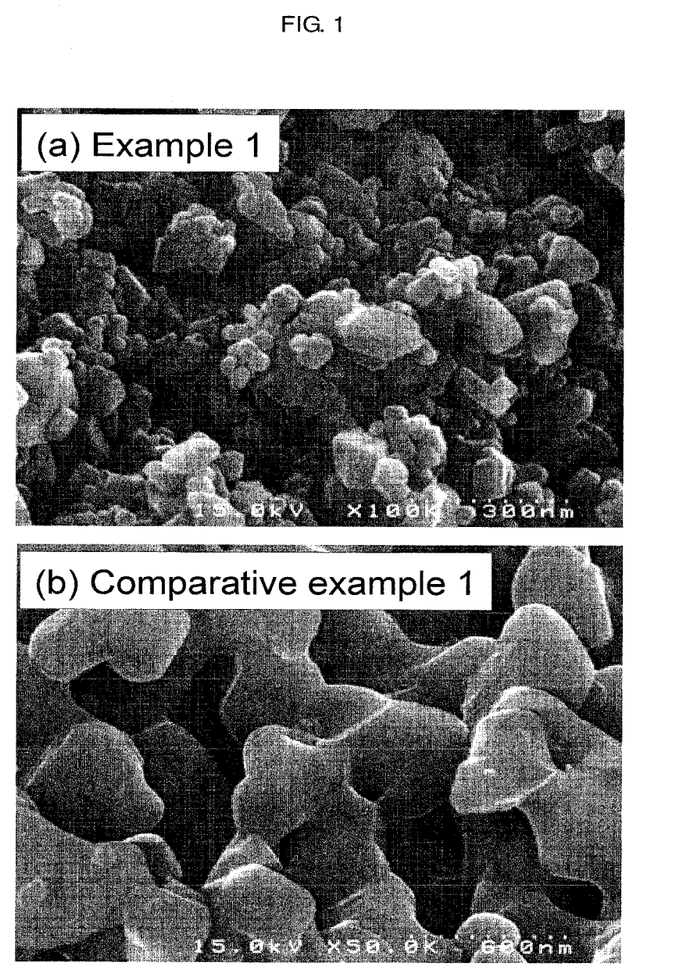
FIG. 1A a SEM photograph illustrating $Li_{4/3}Ti_{5/3}O_4$ nanoparticles of example 1.
FIG. 1B is a SEM photograph illustrating $Li_{4/3}Ti_{5/3}O_4$ nanoparticles of comparative example 1.
Figure 2:
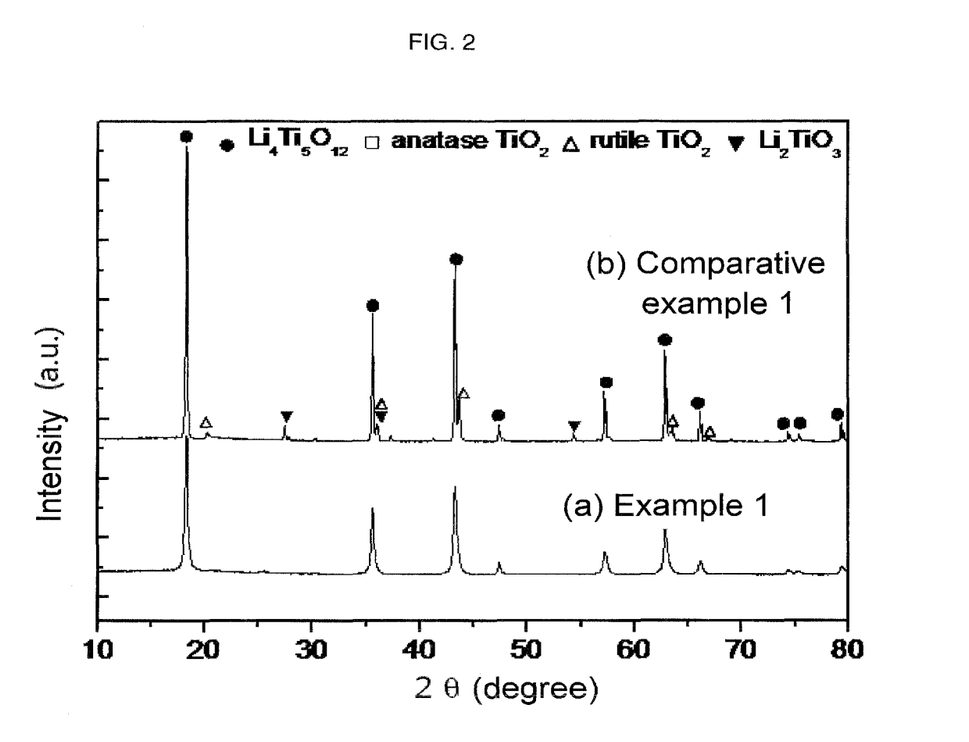
FIG. 2A is an XRD pattern illustrating $Li_{4/3}Ti_{5/3}O_4$ nanoparticles of example 1.
FIG. 2B is an XRD pattern illustrating $Li_{4/3}Ti_{5/3}O_4$ nanoparticles of comparative example 1.
Figure 3:
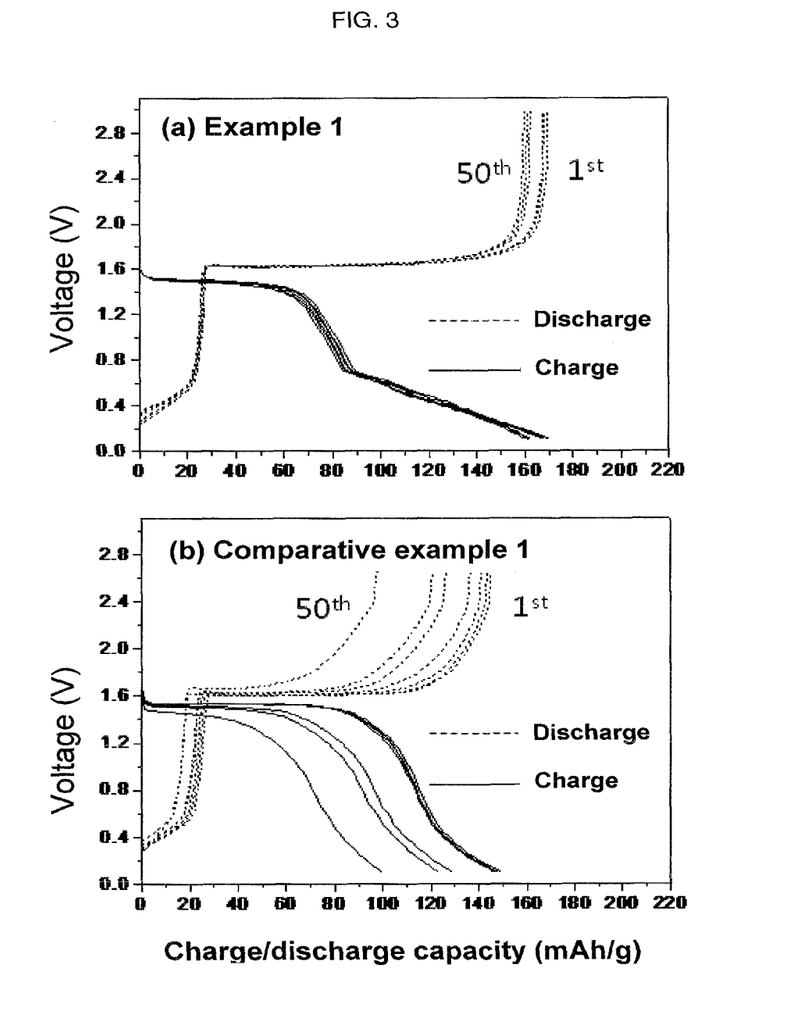
FIG. 3A is a graph illustrating a charge and discharge curve of $Li_{4/3}Ti_{5/3}O_4$ nanoparticles of example 1.
FIG. 3B is a graph illustrating a charge and discharge curve of $Li_{4/3}Ti_{5/3}O_4$ nanoparticles of comparative example 1.
Figure 4:
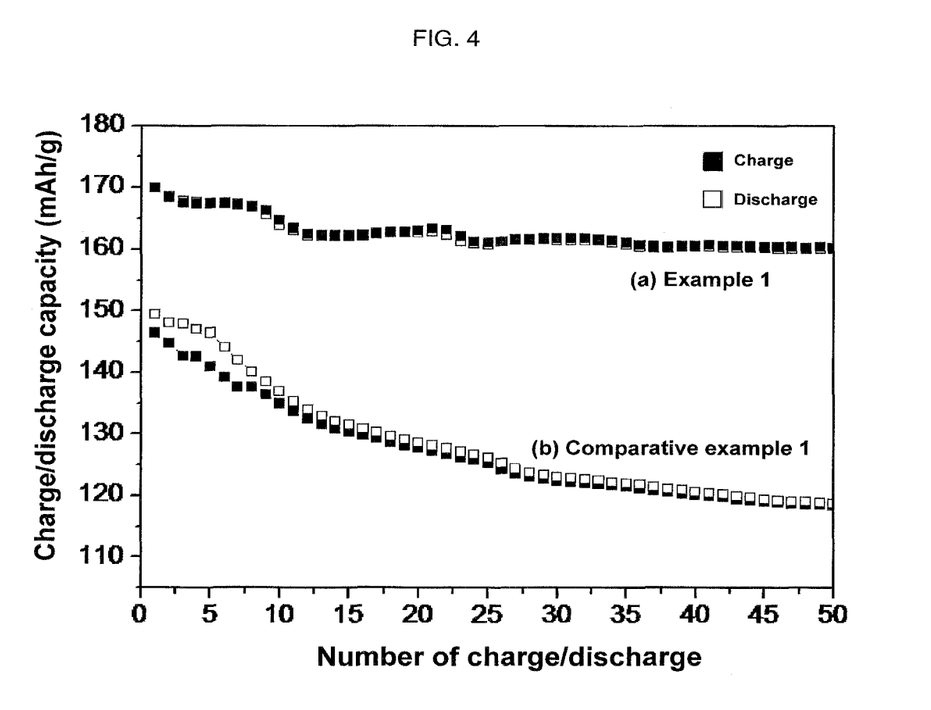
FIG. 4 is a graph in which the cyclability characteristic of batteries fabricated by using $Li_{4/3}Ti_{5/3}O_4$ particles of example 1 and comparative example 1 are compared with each other.

Synthesis of $Li_{4/3}Ti_{5/3}O_4$ Nanoparticles Using Batch-Type Supercritical Fluid Process I Water was introduced into a container and lithium hydroxide (LiOH) was introduced thereinto as a lithium precursor to control the concentration at 0.08 mol/l, and water was introduced into another container and titanium (IV) tetra-iso-propoxide ($Ti[OCH(CH_3)_2]_4$) was introduced thereinto as a titanium precursor to control the concentration at 0.1 mol/l. The lithium hydroxide solution and titanium is tetra-iso-propoxide solution were mixed with each other and then 4 ml of the mixed solution was introduced into a high temperature and high pressure reactor. Then, the high temperature and high pressure reactor was introduced into a salt-bath maintaining at 400° C. to maintain the reaction pressure at 300 bar, and the reaction temperature at 400° C. The mixture was reacted for 6 hours while stirring the reactor using a shaker in the salt-bath. The resultant synthesized $Li_{4/3}Ti_{5/3}O_4$ nanoparticles were separated and collected by using a filter. Unreacted precursors were separated from the collected $Li_{4/3}Ti_{5/3}O_4$ nanoparticles using a centrifugal separator, and subsequently cleaned using distilled and deionized water. Subsequent to the cleaning process, $Li_{4/3}Ti_{5/3}O_4$ nanoparticles were dried in a vacuum oven at 60° C. for 24 hours to remove water. FIG. 1A is a SEM image illustrating $Li_{4/3}Ti_{5/3}O_4$ nanoparticles synthesized by the present example 1. FIG. 2A is an XRD pattern illustrating the synthesized $Li_{4/3}Ti_{5/3}O_4$ nanoparticles. A BET result of the $Li_{4/3}Ti_{5/3}O_4$ nanoparticles obtained subsequent to the cleaning process is illustrated in Table 1. FIG. 3A is a graph illustrating a charge/discharge profile of a battery fabricated by using $Li_{4/3}Ti_{5/3}O_4$ nanoparticles obtained subsequent to the cleaning process. FIG. 4A and Table 1 illustrate an electrochemical cyclability profile of a battery fabricated by using $Li_{4/3}Ti_{5/3}O_4$ nanoparticles obtained subsequent to the cleaning process.

Comparative Example 1

Synthesis of $Li_{4/3}Ti_{5/3}O_4$ Particles Using Solid-State Method $Li_4Ti_5O_{12}$ particles were synthesized by a solid-state method. Zirconia balls, 4 g $Li_2CO_3$, and 5 g $TiO_2$ particles at a ratio of 1:20 were introduced into a zirconia bowl and sufficiently ball-milled for 3 hours and mixed in a solid state. The mixture synthesized in this manner was calcinated at 850° C. for 24 hours while flowing air to synthesize $Li_4Ti_5O_{12}$ particles. The synthesized particles were analyzed by using the same method as example 1 to show the result in FIGS. 1B, 2B, 3B and Table 1. An electrode was fabricated by using the synthesized $Li_4Ti_5O_{12}$ with the same method as the example 1 and the cyclability was analysed to show the result in FIG. 4B and Table 1. The present comparative example is a publicly-known method for synthesizing a $Li_4Ti_5O_{12}$ anode active material having a spinel structure using a solid-state method in the related art, which is provided to compare with $Li_4Ti_5O_{12}$ anode active material particles having a spinel structure synthesized by a process using supercritical fluids according to the present invention.

As illustrated in FIG. 1A, it can be seen that $Li_{4/3}Ti_{5/3}O_4$ particles synthesized by using supercritical water in example 1 are in the size of 10-100 nm and scarcely have agglomeration phenomenon between particles, whereas $Li_{4/3}Ti_{5/3}O_4$ particles synthesized by using the solid-state method in the comparative example 1 as illustrated in FIG. 1B have a very large crystal size and a degree of agglomeration between particles. Furthermore, as illustrated in Table 1, it was confirmed that a BET specific surface area of $Li_{4/3}Ti_{5/3}O_4$ particles synthesized in supercritical water according to the present invention is 28.4 m$^2$/g, and is far higher than that of $Li_{4/3}Ti_{5/3}O_4$ particles, which is 5.4 m$^2$/g, synthesized by the solid-state method in the related art. As a result, it was confirmed that $Li_{4/3}Ti_{5/3}O_4$ particles synthesized in supercritical water are far smaller in size than $Li_{4/3}Ti_{5/3}O_4$ particles synthesized by the solid-state method. As illustrated in FIG. 2A, it is seen from the XRD patterns that there do not exist impurities in $Li_{4/3}Ti_{5/3}O_4$ particles synthesized in supercritical water in example 1 whereas particles synthesized by the solid-state method in the comparative example 1 are mixed with impurities such as anatase $TiO_2$, rutile $TiO_2$, $Li_2TiO_3$, and the like in addition to $Li_{4/3}Ti_{5/3}O_4$. Comparing the performance of a battery formed by using particles synthesized according to the example 1 and comparative example, as illustrated in FIG. 3A, it was confirmed that a battery using $Li_{4/3}Ti_{5/3}O_4$ nanoparticles synthesized in supercritical water in example 1 exhibits 170 mAh/g of initial discharge capacity at 0.1-3.0 V under 1 C condition, and exhibits 160 mAh/g of discharge capacity after 50 cycles, thereby providing a very excellent charge and discharge capacity and an excellent cycle life characteristic, whereas a battery fabricated by using $Li_{4/3}Ti_{5/3}O_4$ particles synthesized by the solid-state method in the comparative example 1 exhibits 146 mAh/g of initial discharge capacity, and exhibits 98 mAh/g of discharge capacity after 50 cycles, thereby providing a very bad charge and discharge capacity and cycle life characteristic compared to the case of a battery using $Li_{4/3}Ti_{5/3}O_4$ nanoparticles synthesized in supercritical water. It is considered because a size of $Li_{4/3}Ti_{5/3}O_4$ particles synthesized by a generally used solid-state method is much larger than that of $Li_{4/3}Ti_{5/3}O_4$ nanoparticles synthesized in supercritical water according to the present invention, and thus the insertion/deinsertion rate of lithium ions during charging and discharging becomes very slow, and excessive impurities in addition to $Li_{4/3}Ti_{5/3}O_4$ particles are mixed therewith, thereby providing a low electrochemical discharge capacity. From the above result, it was confirmed that the electrochemical property of a battery fabricated by using $Li_{4/3}Ti_{5/3}O_4$ nanoparticles synthesized in supercritical water is far more excellent than that of a battery fabricated by using $Li_{4/3}Ti_{5/3}O_4$ nanoparticles synthesized by the solid-state method.

Example 2

Figure 5:
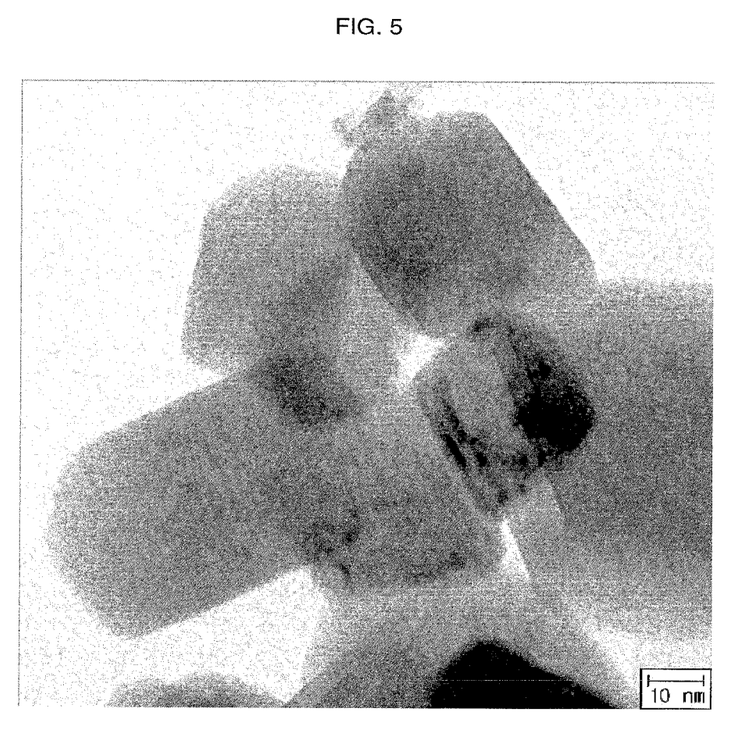
FIG. 5 is a TEM photograph illustrating $Li_{4/3}Ti_{5/3}O_4$ nanoparticles synthesized by using a batch-type supercritical water process in example 2.

Synthesis of $Li_{4/3}Ti_{5/3}O_4$ Nanoparticles Using Batch-Type Supercritical Fluid Process II $Li_{4/3}Ti_{5/3}O_4$ anode active material nanoparticles were synthesized by the same method as the example 1 excluding that the reaction time is 2 hours instead of 6 hours in the example 1. FIG. 5 is a TEM image illustrating $Li_{4/3}Ti_{5/3}O_4$ nanoparticles synthesized by using the supercritical water of the present invention as described above. A BET specific surface area of the synthesized $Li_{4/3}Ti_{5/3}O_4$ particles was measured by the same method as the example 1 to illustrate the result together in Table 1, and an electrode was fabricated by the same method as the example 1 using the synthesized $Li_{4/3}Ti_{5/3}O_4$ anode active material and a charge and discharge capacity and a cyclability thereof were analysed to illustrate the result together in Table 1.

Example 3

Synthesis of $Li_{4/3}Ti_{5/3}O_4$ Nanoparticles Using Batch-Type Supercritical Fluid Process III In this example, the concentration of lithium hydroxide (LiOH) as a lithium precursor is controlled to 0.8 mol/l instead of 0.08 mol/l, and the concentration of titanium (IV) tetra-n-propoxide $(Ti[(OCH(CH_3)_2]_4)$ was controlled to 1.0 mol/l instead of introducing 0.1 mol/l, and the reaction time was maintained for 15 minutes instead of 6 hours to synthesize $Li_{4/3}Ti_{5/3}O_4$ anode active material nanoparticles using the same method as the example 1. The synthesized $Li_{4/3}Ti_{5/3}O_4$ nanoparticles were calcinated at 700° C. for 6 hours to increase the crystallinity. A BET specific surface area of the synthesized $Li_{4/3}Ti_{5/3}O_4$ particles was measured by the same method as the example 1 to illustrate the result in Table 1, and an electrode was fabricated by the same method as the example 1 using the synthesized $Li_{4/3}Ti_{5/3}O_4$ anode active material and a charge and discharge capacity and a cyclability thereof were analyzed to illustrate the result in Table 1.

When a reaction time for synthesizing $Li_{4/3}Ti_{5/3}O_4$ nanoparticles in supercritical water in the examples 1 and 2 as illustrated in Table 1 is decreased from 6 hours to 2 hours, the BET specific surface area is increased from 28.4 $m^2/g$ to 34.2 $m^2/g$, and thus it was confirmed that the size of $Li_{4/3}Ti_{5/3}O_4$ nanoparticles synthesized in example 2 is smaller than that of $Li_{4/3}Ti_{5/3}O_4$ nanoparticles synthesized in example 1. It is considered because a residence time in the reactor becomes long, thereby allowing $Li_{4/3}Ti_{5/3}O_4$ particles to be agglomerated. An initial discharge capacity of $Li_{4/3}Ti_{5/3}O_4$ nanoparticles synthesized in the example 1 was 170 mAh/g in the range of 0.1-3.0 V under 1 C condition and a discharge capacity after 50 cycles thereof was 160 mAh/g, whereas an initial discharge capacity of $Li_{4/3}Ti_{5/3}O_4$ nanoparticles synthesized in the example 2 was 165 mAh/g and a discharge capacity after 50 cycles thereof was 150 mAh/g, and thus it was confirmed that the charge and discharge capacity of $Li_{4/3}Ti_{5/3}O_4$ nanoparticles synthesized in the example 1 is more excellent. It is considered because the crystallinity of the synthesized $Li_{4/3}Ti_{5/3}O_4$ is increased and an amount of impurities is reduced as increasing the reaction time. On the other hand, in case of $Li_{4/3}Ti_{5/3}O_4$ nanoparticles synthesized by increasing the concentration of lithium hydroxide as a lithium precursor for synthesizing $Li_{4/3}Ti_{5/3}O_4$ nanoparticles in supercritical water in example 3 to 0.8 mol/l instead of 0.08 mol/l, and increasing the concentration of titanium (IV) tetra-n-propoxide $(Ti[(OCH(CH_3)_2)]_4)$ to 1.0 mol/l instead of 0.1 mol/l, and then calcinating the nanoparticles at 700° C. for 6 hours, a BET specific surface area thereof was 12.1 $m^2/g$, it was confirmed to be smaller than that of $Li_{4/3}Ti_{5/3}O_4$ nanoparticles without a calcination process in the examples 1 and 2. As a result, it is seen that the size of particles was increased to a certain extent subsequent to the calcination process. On the other hand, an initial discharge capacity of $Li_{4/3}Ti_{5/3}O_4$ nanoparticles synthesized in the example 3 was 217 mAh/g in the range of 0.1-3.0 V under 1 C condition and a discharge capacity after 50 cycles thereof was 193 mAh/g, and thus it was confirmed to be increased compared to the charge and discharge capacity of the nanoparticles synthesized in the examples 1 and 2. It is considered because the crystallinity and compactness of particles subsequent to the calcination process was increased.

Example 4

Synthesis of $Li_{4/3}Ti_{5/3}O_4$ Nanoparticles Using Batch-Type Supercritical Fluid Process IV In this example, a solution was prepared by dissolving lithium hydroxide (LiOH) as a lithium precursor into methanol instead of distilled and deionized water, and dissolving titanium (IV) tetra-n-propoxide $(Ti[(OCH(CH_3)_2)]_4)$ into methanol instead of distilled and deionized water. $Li_{4/3}Ti_{5/3}O_4$ anode active material nanoparticles were synthesized by the same method as the example 1, excluding that supercritical methanol was used instead of supercritical water as a

TABLE 1

Figure 6:
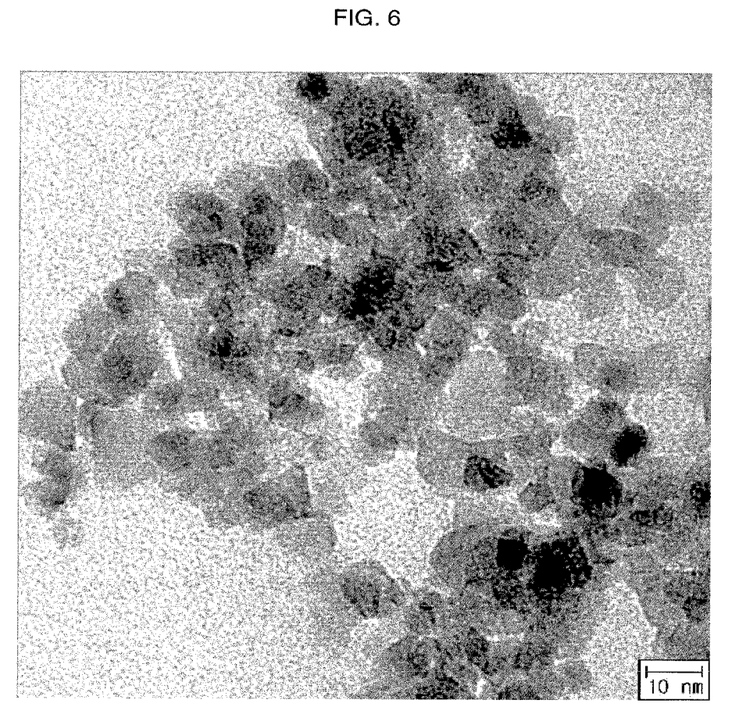
FIG. 6 is a TEM photograph illustrating $Li_{4/3}Ti_{5/3}O_4$ nanoparticles synthesized by using a batch-type supercritical methanol process in example 4.
Figure 7:
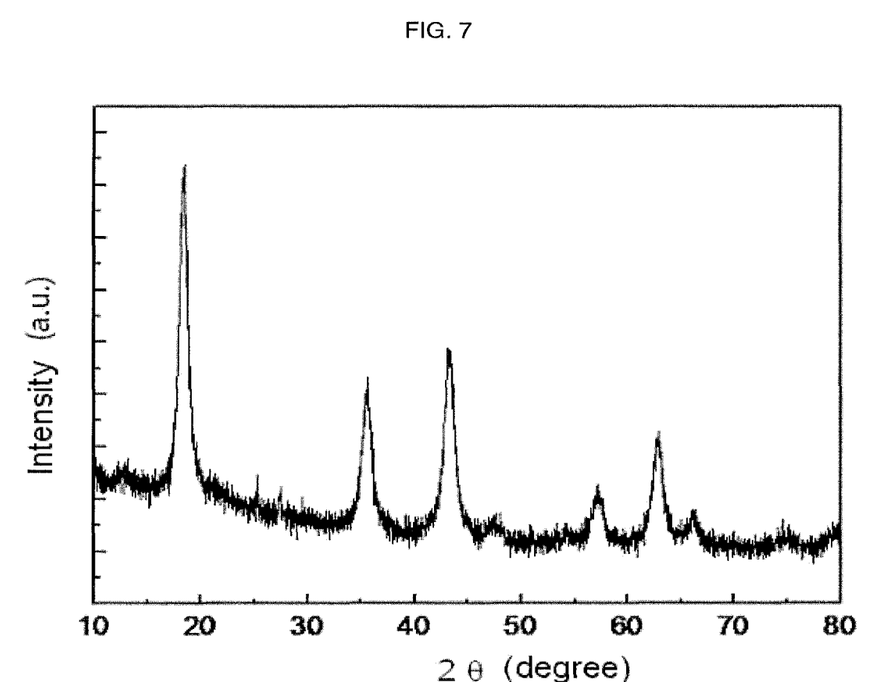
FIG. 7 is an XRD pattern illustrating $Li_{4/3}Ti_{5/3}O_4$ nanoparticles synthesized by using a batch-type supercritical methanol process in example 4.

|  | LiOH concentration (mol/l) | $Ti[OCH(CH_3)_2]_4$ concentration (mol/l) | reaction time | BET specific surface area ($m^2/g$) | initial discharge capacity @ 1 C (mAh/g) | discharge capacity after 50 cycles @ 1 C (mAh/g) |
|---|---|---|---|---|---|---|
| Example 1 | 0.08 | 0.1 | 6 hr | 28.4 | 170 | 160 |
| Comparative example 1 | — | — | — | 5.4 | 149 | 118 |
| Example 2 | 0.08 | 0.1 | 2 hr | 34.2 | 165 | 150 |
| Example 3 | 0.8 | 1.0 | 15 min | 12.1 | 217 | 193 | reaction solvent. FIG. 6 is a TEM image illustrating $Li_{4/3}Ti_{5/3}O_4$ nanoparticles synthesized by a $Li_{4/3}Ti_{5/3}O_4$ anode active material synthesis method using supercritical methanol according to the present invention. FIG. 7 is an XRD pattern illustrating the synthesized $Li_{4/3}Ti_{5/3}O_4$ nanoparticles. A BET specific surface area of the synthesized $Li_{4/3}Ti_{5/3}O_4$ particles was measured by the same method as the example 1 to illustrate the result in Table 2, and an electrode was fabricated by the same method as the example 1 using the synthesized $Li_{4/3}Ti_{5/3}O_4$ anode active material and a charge and discharge capacity and cyclability thereof were analysed to illustrate the result together in Table 2.

Example 5

Synthesis of $Li_{4/3}Ti_{5/3}O_4$ Nanoparticles Using Batch-Type Supercritical Fluid Process V In this example, a solution was prepared by dissolving lithium hydroxide (LiOH) as a lithium precursor into ethanol instead of distilled and deionized water, and dissolving titanium (IV) tetra-n-propoxide $(Ti[(OCH(CH_3)_2)]_4)$ into ethanol instead of distilled and deionized water. $Li_{4/3}Ti_{5/3}O_4$ anode active material nanoparticles were synthesized by the same method as the example 2, excluding that supercritical ethanol was used instead of supercritical water as a reaction solvent. A BET specific surface area of the synthesized $Li_{4/3}Ti_{5/3}O_4$ particles was measured by the same method as the example 1 to illustrate the result in Table 2, and an electrode was fabricated by the same method as the example 1 using the synthesized $Li_{4/3}Ti_{5/3}O_4$ anode active material and a charge and discharge capacity and cyclability thereof were analysed to illustrate the result together in Table 2.

similar to that of $Li_{4/3}Ti_{5/3}O_4$ nanoparticles synthesized in supercritical alcohols in the examples 4 and 5. As a result, in case of using supercritical methanol and supercritical ethanol, it was confirmed that $Li_{4/3}Ti_{5/3}O_4$ nanoparticles having an excellent charge and discharge capacity can be synthesized similarly to the case of using supercritical water.

Example 6

Synthesis of $Li_{4/3}Ti_{5/3}O_4$ Nanoparticles Using Continuous Supercritical Fluid Process Methanol was introduced into a container and lithium hydroxide (LiOH) was introduced thereinto as a lithium precursor to control the concentration at 0.12 mol/l. Methanol was introduced into another container and titanium (IV) tetra-iso-propoxide $(Ti[OCH(CH_3)_2]_4)$ was introduced thereinto as a titanium precursor to control the concentration at 0.1 mol/l. The lithium solution and titanium solution were mixed with each other and the mixed solution was pressurized at 250 bar by pumping it at the rate of 1.5 g/min under ambient temperature using a high-pressure pump. Methanol was introduced into another container and was pressurized at 250 bar by pumping it at the rate of 9 g/min using a high-pressure pump and transferred to a preheater. The pressurized precursor mixed solution and methanol were mixed in a mixer maintaining at 400° C., and the mixture was transferred to a high-pressure crystallization reactor maintaining at 400° C. and reacted for 1 hour. The resultant solution of $Li_{4/3}Ti_{5/3}O_4$ nanoparticles was cooled by using a freezer, and then the $Li_{4/3}Ti_{5/3}O_4$ nanoparticles were separated and collected by using a filter. Unreacted precursors were separated from the collected $Li_{4/3}Ti_{5/3}O_4$ nanoparticles using a centrifugal sepa-

TABLE 2

| | LiOH concentration/ $Ti[OCH(CH_3)_2]_4$ concentration (mol/l) | reaction time | reaction solvent | BET specific surface area ($m^2/g$) | initial discharge capacity @ 1 C (mAh/g) | discharge capacity after 50 cycles @ 1 C (mAh/g) |
|---|---|---|---|---|---|---|
| Example 2 | 0.08/0.1 | 2 hr | supercritical water | 28.4 | 165 | 150 |
| Example 4 | 0.08/0.1 | 2 hr | supercritical methanol | 40.5 | 160 | 151 |
| Example 5 | 0.08/0.1 | 2 hr | supercritical ethanol | 42.2 | 157 | 148 |

As illustrated in Table 2, in the examples 2 through 5, when $Li_{4/3}Ti_{5/3}O_4$ nanoparticles were synthesized in supercritical water, a BET specific surface area thereof was 28.4 $m^2/g$, but drastically increased to 40.5 $m^2/g$ when $Li_{4/3}Ti_{5/3}O_4$ nanoparticles were synthesized in supercritical methanol and also drastically increased to 42.2 $m^2/g$ when using supercritical ethanol, and thus it was confirmed that the size of $Li_{4/3}Ti_{5/3}O_4$ nanoparticles synthesized in supercritical alcohols in the examples 4 and 5 is smaller than that of $Li_{4/3}Ti_{5/3}O_4$ nanoparticles synthesized using supercritical water in the example 1. On the other hand, an initial discharge capacity of $Li_{4/3}Ti_{5/3}O_4$ nanoparticles synthesized in the example 1 was 165 mAh/g in the range of 0.1-3.0 V under 1 C condition and a discharge capacity after 50 cycles thereof was 150 mAh/g, and an initial discharge capacity of $Li_{4/3}Ti_{5/3}O_4$ nanoparticles synthesized in supercritical alcohols in the examples 4 and 5 was 157-160 mAh/g and a discharge capacity after 50 cycles thereof was 148-151 mAh/g, and thus it was confirmed that the charge and discharge capacity of $Li_{4/3}Ti_{5/3}O_4$ nanoparticles synthesized in supercritical water in the example 1 is rator, and subsequently cleaned using water. Subsequent to the cleaning process, $Li_{4/3}Ti_{5/3}O_4$ nanoparticles were dried in a vacuum oven at 60° C. for a day to remove water, and then calcinated at 800° C. for 4 hours. A BET specific surface area of the synthesized $Li_{4/3}Ti_{5/3}O_4$ nanoparticles was large, 35.3 $m^2/g$, and an initial discharge capacity thereof was 180 mAh/g in the range of 0.1-3.0 V under 1 C condition and a discharge capacity after 50 cycles thereof was 171 mAh/g, and thus it was confirmed that a charge and discharge capacity and cyclability thereof are very excellent. As a result, even in case of using a continuous process, it was confirmed that $Li_{4/3}Ti_{5/3}O_4$ nanoparticles having an excellent charge and discharge capacity can be synthesized similarly to the case of using a batch-type process.

What is claimed is:
1. A method of synthesizing lithium titanium oxide-based anode active material nanoparticles, the method comprising:
   (a) preparing a lithium precursor solution and a titanium precursor solution;

(b) forming lithium titanium oxide-based anode active material nanoparticles by introducing the lithium precursor solution and titanium precursor solution into a reactor at a supercritical fluid condition; and (c) cleaning and drying the nanoparticles.

2. The method of claim 1, wherein the step (b) is:

(b-1) forming the lithium titanium oxide-based anode active material nanoparticles and crystallizing the nanoparticles by mixing together the lithium precursor solution and titanium precursor solution at the supercritical fluid condition in a batch reactor; or (b-2) forming lithium titanium oxide-based anode active material nanoparticles and crystallizing the nanoparticles by introducing the lithium precursor solution and titanium precursor solution into a continuous reactor maintained at the supercritical fluid condition.

3. The method of claim 1, wherein the lithium titanium oxide-based anode active material nanoparticles are anode active material nanoparticles, represented by $Li_{4/3}Ti_{5/3}O_4$, having a spinel structure.

4. The method of claim 1, wherein a solvent of the lithium precursor solution and titanium precursor solution is water or alcohol.

5. The method of claim 4, wherein the alcohol is selected from the group consisting of methanol, ethanol, propanol, isopropyl alcohol, butanol, isobutanol, 2-butanol, tert-butanol, n-pentanol, isopentyl alcohol, 2-methyl-1-butanol, neopentyl alcohol, diethyl carbinol, methyl propyl carbinol, methyl isopropyl carbinol, dimethyl ethyl carbinol, 1-hexanol, 2-hexanol, 3-hexanol, 2-methyl-1-pentanol, 3-methyl-1-pentanol, 4-methyl-1-pentanol, 2-methyl-2-pentanol, 3-methyl-2-pentanol, 4-methyl-2-pentanol, 2-methyl-3-pentanol, 3-methyl-3-pentanol, 2,2-dimethyl-1-butanol, 2,3-dimethyl-1-butanol, 2,3-dimethyl-2-butanol, 3,3-dimethyl-1-butanol, 2-ethyl-1-butanol, 1-heptanol, 2-heptanol, 3-heptanol, 4-heptanol, and combinations thereof.

6. The method of claim 1, wherein the lithium precursor is selected from the group consisting of lithium hydroxide (LiOH), lithium hydroxide monohydrate ($LiOH.H_2O$), lithium chloride (LiCl), lithium acetate ($LiCH_3COO$), lithium acetate dihydrate ($LiCH_3COO.2H_2O$), lithium sulphate ($Li_2SO_4$), lithium sulfate monohydrate ($Li_2SO_4.H_2O$), lithium phosphate ($Li_3PO_4$), lithium nitrate ($LiNO_3$), and combinations thereof.

7. The method of claim 1, wherein the titanium precursor is selected from the group consisting of titanium (IV) tetramethoxide ($Ti(OCH_3)_4$), titanium (IV) tetraethoxide ($Ti(OCH_2CH_3)_4$), titanium (IV) tetra-n-propoxide ($Ti(OCH_2CH_2CH_3)_4$), titanium (IV) tetra-iso-propoxide ($Ti[OCH(CH_3)_2]_4$), titanium (IV) tetra-n-butoxide ($Ti(OCH_2CH_2CH_2CH_3)_4$), titanium (IV) tetra-iso-butoxide ($Ti[OCHCH_2(CH_3)_2]_4$), titanium (IV) tetra-n-pentoxide ($Ti(OCH_2CH_2CH_2CH_2CH_3)_4$), titanium (IV) tetra-isopentoxide ($Ti[OCHCH_2CH_2(CH_3)_2]_4$), and combinations thereof.

8. The method of claim 1, wherein the concentration of a lithium precursor in the lithium precursor solution is 0.001-10 mol/l.

9. The method of claim 1, wherein the concentration of a titanium precursor in the titanium precursor solution is 0.001-10 mol/l.

10. The method of claim 1, wherein the step (b) is carried out at the conditions of 240-600° C. and 40-600 bar.

11. The method of claim 2, wherein the step (b-1) is carried out for 30 seconds to 24 hours, and the step (b-2) of forming nanoparticles is carried out for 30 seconds to 24 hours.

12. The method of claim 1, further comprising:

(d) calcining the nanoparticles at 500-1000° C. for 10 minutes to 24 hours after the step (c).

13. The method of claim 1, wherein a diameter of the nanoparticle is 1-500 nm.

14. A method of synthesizing lithium titanium oxide-based anode active material nanoparticles, the method comprising:

introducing a lithium precursor solution and a titanium precursor solution into a reactor at a supercritical fluid condition to form lithium titanium oxide-based anode active material nanoparticles.

15. The method of claim 14, further comprising:

cleaning and drying the lithium titanium oxide-based anode active material nanoparticles; and calcining the lithium titanium oxide-based anode active material nanoparticles.

16. The method of claim 14, wherein the lithium titanium oxide-based anode active material nanoparticles comprise $Li_{4/3}Ti_{5/3}O_4$ lithium titanium oxide-based anode active material nanoparticles having a spinel structure.

17. The method of claim 14, wherein the reactor comprises a batch reactor or a continuous reactor.

18. The method of claim 14, wherein a solvent of the lithium precursor solution and the titanium precursor solution is selected from the group consisting of water, methanol, ethanol, propanol, isopropyl alcohol, butanol, isobutanol, 2-butanol, tert-butanol, n-pentanol, isopentyl alcohol, 2-methyl-1-butanol, neopentyl alcohol, diethyl carbinol, methyl propyl carbinol, methyl isopropyl carbinol, dimethyl ethyl carbinol, 1-hexanol, 2-hexanol, 3-hexanol, 2-methyl-1-pentanol, 3-methyl-1-pentanol, 4-methyl-1-pentanol, 2-methyl-2-pentanol, 3-methyl-2-pentanol, 4-methyl-2-pentanol, 2-methyl-3-pentanol, 3-methyl-3-pentanol, 2,2-dimethyl-1-butanol, 2,3-dimethyl-1-butanol, 2,3-dimethyl-2-butanol, 3,3-dimethyl-1-butanol, 2-ethyl-1-butanol, 1-heptanol, 2-heptanol, 3-heptanol, 4-heptanol, and combinations thereof, wherein a lithium precursor in the lithium precursor solution is selected from the group consisting of lithium hydroxide (LiOH), lithium hydroxide monohydrate ($LiOH.H_2O$), lithium chloride (LiCl), lithium acetate ($LiCH_3COO$), lithium acetate dihydrate ($LiCH_3COO.2H_2O$), lithium sulphate ($Li_2SO_4$), lithium sulfate monohydrate ($Li_2SO_4.H_2O$), lithium phosphate ($Li_3PO_4$), lithium nitrate ($LiNO_3$), and combinations thereof, wherein a titanium precursor in the titanium precursor solution is selected from the group consisting of titanium (IV) tetramethoxide ($Ti(OCH_3)_4$), titanium (IV) tetraethoxide ($Ti(OCH_2CH_3)_4$), titanium (IV) tetra-n-propoxide ($Ti(OCH_2CH_2CH_3)_4$), titanium (IV) tetra-iso-propoxide ($Ti[OCH(CH_3)_2]_4$), titanium (IV) tetra-n-butoxide ($Ti(OCH_2CH_2CH_2CH_3)_4$), titanium (IV) tetra-iso-butoxide ($Ti[OCHCH_2(CH_3)_2]_4$), titanium (IV) tetra-n-pentoxide ($Ti(OCH_2CH_2CH_2CH_2CH_3)_4$), titanium (IV) tetra-isopentoxide ($Ti[OCHCH_2CH_2(CH_3)_2]_4$), and combinations thereof.

19. A method of synthesizing $Li_{4/3}Ti_{5/3}O_4$ nanoparticles, the method comprising:

introducing a lithium precursor solution and a titanium precursor solution into a reactor at a supercritical fluid condition to form $Li_{4/3}Ti_{5/3}O_4$ nanoparticles.

20. The method of claim 19, further comprising:

cleaning and drying the $Li_{4/3}Ti_{5/3}O_4$ nanoparticles; and calcining the $Li_{4/3}Ti_{5/3}O_4$ nanoparticles.

* * * * *